Figure 1:
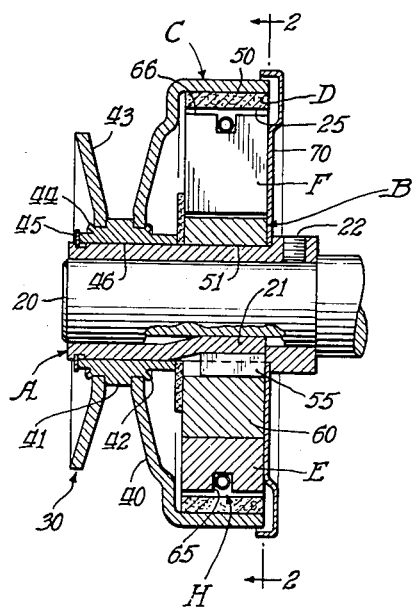

July 10, 1956     R. C. BOWERS     2,753,967

CENTRIFUGAL CLUTCH

Filed June 11, 1953

Inventor:
Roy C. Bowers
By Joseph M. Gartner
Atty.

United States Patent Office 2,753,967
Patented July 10, 1956

2,753,967

CENTRIFUGAL CLUTCH

Roy C. Bowers, Detroit, Mich., assignor to Morse Chain Company, Ithaca, N. Y., a corporation of New York Application June 11, 1953, Serial No. 360,963

2 Claims. (Cl. 192—105)

This invention relates, in general, to power transmission equipment and has particular reference to a centrifugal clutch.

Otherwise stated, the invention is embodied in a clutch actuated responsive to a centrifugal force, said clutch embodying a novel arrangement and associated parts thereof providing an assembled centrifugal clutch of simple construction and economical to manufacture.

More specifically stated, it is an important object and accomplishment of the invention to provide a centrifugal clutch wherein the engagement of the clutch is effected by centrifugal force and wherein there is provided a clutch drum having a power take-off medium such as, for example, a belt pulley, sprocket teeth adapted to carry a chain, or gear teeth adapted for intermeshing with other gears; an annular lining of friction material disposed in said drum; speed responsive means including weighted elements mounted on a hub, all of which are arranged for rotation in unison, said weighted elements being arranged to move radially outwardly responsive to centrifugal forces developed by rotation of said speed responsive means; spring means encircling the periphery of said weighted elements to provide a force opposing said outward movement of said weighted elements; said arrangement being particularly characterized in that the lining is disposed between the drum and the weighted elements and that the weighted elements are adapted to engage a friction surface of the lining upon application of sufficient centrifugal force, and as the magnitude of the centrifugal force increases the pressure upon the lining will be increased proportionately thereby to provide a progressive engagement between the weighted elements, the lining and the drum to cause said parts to rotate in unison to effect a driving arrangement for said power take-off medium.

The invention contemplates improvements in a centrifugal clutch whereby the engagement of the clutch elements will be progressive, smooth and chatter free with the engagement of the clutch elements being responsive to centrifugal force developed by rotation of elements of the clutch.

An important object and accomplishment of the invention is to provide a centrifugal clutch having a power take-off medium, the elements of which are formed by simple stamping operations and include an inexpensive powdered metal bushing, thus affording a substantial reduction in the cost of manufacturing over prior art clutches of this type.

An ancillary object and accomplishment of the invention is to provide a more efficient centrifugal clutch which is adapted to be economically manufactured by the employment of simple stamping operations and some of the parts of which are made of powdered metal, the clutch being so designed as to permit the manufacture and assembly thereof in accordance with present day large scale mass production manufacturing methods of construction and assembly.

The invention seeks, as a final object and accomplishment, to provide a centrifugal clutch particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same substantially as hereinafter more fully described, and as particularly pointed out in the appended claims.

Figure 2:
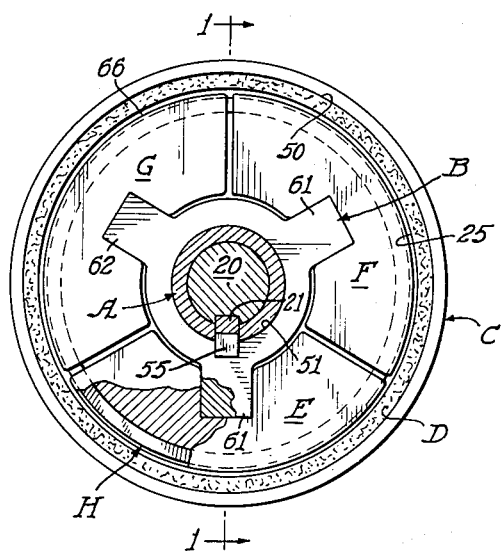
Figure 3:
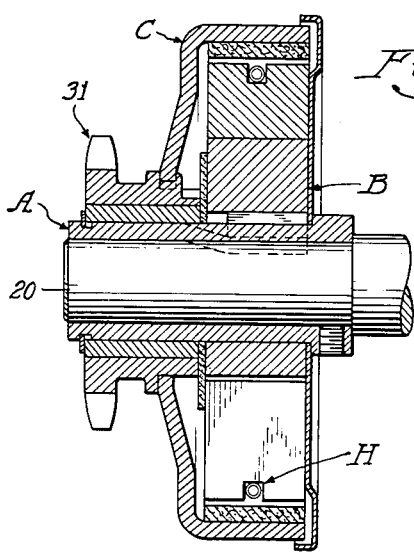

Exemplary embodiments of the invention are illustrated in the accompanying drawing forming a part hereof and wherein:

Fig. 1 is a sectional view of a centrifugal clutch and power transmission driving medium embodying the features of the present invention, this view being taken substantially on the plane of the line 1—1 in Fig. 2;

Fig. 2 is an end elevational view of the centrifugal clutch depicted in Fig. 1 with portions of the centrifugal clutch being shown in section to more clearly illustrate the construction thereof, this view being substantially on the plane of the line 2—2 in Fig. 1; and Fig. 3 is a sectional view of a centrifugal clutch similar to that depicted in Fig. 1 with the exception that a different type of power transmission take-off medium is shown.

The drawing is to be more or less of a schematic character for the purpose of illustrating and disclosing typical or preferred forms of the improvements contemplated herein and in the drawing like reference characters identify the same parts in the several views.

Before explaining the present invention in detail, attention is invited to the premises that the invention is not limited in its application to the details of construction and arrangement of parts illustrated in the accompanying drawing since the invention obviously is capable of other embodiments and of being practiced or carried out in various ways. Moreover, the details of construction may be modified to suit particular conditions or to satisfy the engineering genius of various competitive manufacturers, and I do not wish to be limited to the construction of these elements as set forth except where such construction particularly concerns the invention contemplated herein. Furthermore, the phraseology or terminology employed herein is for the purpose of description and not of limitation, and it is not intended to limit the invention claimed herein beyond the requirement of the prior art and the scope of the appended claims.

In the exemplary embodiment of the invention depicted in Figs. 1 and 2, the centrifugal clutch contemplated by this invention comprises, in general, the component part assemblies respectively indicated in their entirety by the letters as follows: A hub as at A mounted on a driving shaft 20 for rotation therewith by means of the key 21 and a set screw 22; a driver B carried by portions of the hub A for rotation therewith; a drum as at C; an annular lining D of friction material inserted in said drum; a plurality of weighted elements E, F and G guided by portions of said plate member for relative movement therebetween, and said weighted elements being arranged to move radially outwardly responsive to centrifugal forces developed by rotation of said plate B; garter spring means indicated at H and surrounding the periphery of said weighted elements E, F and G, said spring means being disposed to provide a force in opposition to the outward movement of the weighted elements; said arrangement being particularly characterized in that the lining D is disposed between the drum C and the weighted elements E, F and G and that the weighted elements E, F and G are adapted to engage a friction surface 25 of the lining upon application of sufficient centrifugal force, and as the magnitude of the centrifugal force increases the pressure upon the lining D will be increased proportionately thereby to provide a progressive engagement between the weighted elements E, F and G, the lining D and the drum C to cause said parts to rotate in unison to effect a driving arrangement therebetween.

For purposes of illustration, the drum C is provided with a V-belt pulley indicated in its entirety by the numeral 30 and adapted to receive a suitable V-belt drive; however, it is within the purview of this invention to substitute for said V-belt pulley 30 a sprocket (Fig. 3) for a chain, or a set of gear teeth (not shown) adapted for intermeshing with other gear trains.

Particular attention is invited to Fig. 1 wherein it can be seen that the drum C is formed by a stamping operation to define the shape as shown. The drum C defines one side 40 of the V-shaped pulley and this side terminates at a powdered metal hub 41, the attachment between the terminal end of the side 40 and the powdered metal bushing 41 being accomplished by swaging as at 42. The other side 43 of the V-shaped pulley is also made by a stamping operation and is fixedly mounted on the powdered metal hub 41 by means of swaging as at 44.

In order to prevent axial movement of the powdered metal bushing 41 to the left as shown in Fig. 1, there is provided a snap ring 45. It is obvious that the powdered metal bushing is provided with a central opening 46 adapted to receive the hub A for relative rotation therebetween when the clutch is disengaged.

As may be best seen in Figs. 1 and 2, the lining D is composed of a frictional material formed to define an annular shape to provide a friction surface 25 and a friction surface 50, said lining being disposed in the drum but not fastened thereto so that these elements may have relative rotation therebetween.

An important contribution to this art is the provision of the relatively simple and economically manufactured driver B which is provided with a central through bore 51 adapted to receive portions of the hub A adjacent one end thereof, and the driver B is fixedly mounted on the hub A by means of a fitted key 55 so that when the hub is rotated by means of a drive shaft 20 the driver B will rotate therewith.

Particular attention is invited to Fig. 1 wherein it can be seen that the relatively thin walled hub A has the punched key 21 extending down into the bore thereof and the depression on the outside design of the hub is then used to receive portions of the fitted key 55 to fasten the three prong driver B to the hub A so that these elements will rotate in unison.

It can be seen in Fig. 2 that the weighted elements E, F and G are slipped over the driving prongs 60, 61 and 62 of the driver B and are retained by the garter spring which is effective to hold the weights out of contact with the lining D until a certain engagement speed is reached.

The weighted elements E, F and G are formed of relatively heavy material so as to react to the centrifugal forces applied thereto to effect radial outward movement thereof to overcome the forces of the garter spring H for the purpose of establishing engagement with the friction surface 25 of the lining D.

In order to urge said weighted elements E, F and G to their normal inoperative positions and to provide a force in opposition to the centrifugal forces established by rotation of the hub and the plate, there is provided the garter spring H disposed in a groove 65 on the periphery of each of said weighted elements. Thus, it can be seen that the spring H will tend to urge the weighted elements E, F and G to their normal inoperative position so that the arcuate surfaces 66 are disengaged from the friction surface 25 of the friction lining D. When sufficient force is applied responsive to rotation of the hub A, the opposition forces of the spring will be overcome to permit engagement of the arcuate surfaces as at 66 with the friction surface 25 of the lining D. As the centrifugal force increases responsive to increased speed of rotation the pressures applied will be proportionately greater to cause a progressive engagement of the friction surface 25 with the arcuate surface 66 to cause the same to rotate in unison and as this is being accomplished the friction surface 50 is also being progressively engaged with the drum C to cause these parts to finally rotate in unison to effect a driving arrangement to the driven medium which in this case is illustrated as being the V-belt pulley 30.

By employing the principles of this invention, there is established a smooth and chatter-free clutch engagement by the progressive engagement of the arcuate surface 66 with the friction surface 25 of the liner D and as the opposition to relative movement of these parts is overcome, there is a further opportunity for progressive engagement with the friction surface 50 of the liner D and the drum C. Thus, if the opposition to relative movement of the surface 66 with respect to the friction surface 25 is overcome sharply or quickly, then the reaction to this sharp and quick engagement can be absorbed and taken by the relief effected by the progressive engagement between the friction surface 50 and the drum C, or vice versa.

It can also be seen that when the rotative speed of the hub A and driver B is reduced, the opposition forces of the spring will become effective to cause movement of the weighted elements radially inwardly to effect disengagement of the clutch.

Of course, the system may be balanced by judicious selection of proper weight in the weighted elements so that predetermined speeds of rotation will impart centrifugal forces sufficient and necessary to cause proper engagement of the clutch as desired.

The annular plate 70 is provided to form a closure member for the clutch and to prevent relative axial movement of the clutch elements, this plate being formed by stamping to define the shape as shown in Fig. 1.

Attention is invited to Fig. 3 which illustrates a clutch substantially of the same construction as that shown in Fig. 1, with the exception that a chain sprocket 31 is associated with the driving hub C.

Because of the relatively simple construction the centrifugal clutch contemplated by this invention may be economically manufactured and employed to advantage in accordance with present day large scale manufacturing methods of construction and assembly.

From the foregoing, it may be observed that I have provided a centrifugal clutch which efficiently fulfills the objects thereof and which provides numerous advantages which may be summarized as follows:

1. Structurally simple, efficient and durable;
2. Economical to manufacture and readily adaptable to mass production manufacturing methods of construction and assembly; and
3. The provision of a clutch actuated responsive to centrifugal force, said clutch embodying a novel association of parts formed by simple stamping operations and employing powdered metal parts, thus affording substantial economies in the manufacturing and assembly thereof.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A centrifugal clutch comprising: a hub having a bore adapted to receive a drive shaft having a groove, said hub having a punched key portions of which project into the bore of the hub and adapted for receipt in the groove in said drive shaft, a bushing carried by said hub for relative rotation therebetween, said bushing being formed of powdered metal, a unitary clutch drum formed by stamping and mounted on said powdered metal bushing with portions thereof defining one side wall of a V-shaped pulley, the other side wall of said V-shaped pulley being formed by a stamping and mounted on said bushing in spaced relationship with respect to said first-mentioned side of said V-shaped pulley, a clutch drive member mounted on said hub and the periphery of which is provided with a plurality of radially outwardly projecting prongs, means including a key adapted to be received into the depression defined by said punch key and portions of said clutch drive member to effect rotation of said hub and said drive member in unison, weighted elements each having a recess adapted to receive a respective prong of said clutch drive member and arranged to move radially outwardly responsive to centrifugal forces developed by rotation of said drive member, an annular liner of friction material disposed in said drum, and spring means arranged to surround the periphery of said weighted elements to provide a force in opposition to said outward movement of said weighted elements.

2. A centrifugal clutch comprising: a hub having a bore adapted to receive a drive shaft, a powdered metal bushing carried by said hub, a unitary clutch drum formed by stamping and mounted on said powdered metal bushing, a clutch drive member mounted on said hub and the periphery of which is provided with a plurality of radially outwardly projecting prongs, weighted elements each having a recess adapted to receive a respective prong of said clutch drive member and arranged to move radially outwardly responsive to centrifugal forces developed by rotation of said drive member, an annular liner of friction material disposed in said drum, and spring means arranged to surround the periphery of said weighted elements to provide a force in opposition to said outward movement of said weighted elements.

References Cited in the file of this patent

UNITED STATES PATENTS

| | | |
|---|---|---|
| Re. 19,110 | Bethenod et al. | Mar. 13, 1934 |
| 1,683,954 | Carrey | Sept. 11, 1928 |
| 1,921,719 | Allen | Aug. 8, 1933 |
| 1,988,922 | Stephenson | Jan. 22, 1935 |
| 2,016,643 | Lowndes | Oct. 8, 1935 |
| 2,214,602 | Arnold | Sept. 10, 1940 |
| 2,251,588 | Gilbert | Aug. 5, 1941 |
| 2,504,177 | Bruestle | Apr. 18, 1950 |
| 2,526,049 | Schroeder | Oct. 17, 1950 |
| 2,703,163 | Millar | Mar. 1, 1955 |

FOREIGN PATENTS

| | | |
|---|---|---|
| 897,941 | France | June 19, 1944 |